(12) United States Patent
Britt et al.

(10) Patent No.: US 10,238,907 B2
(45) Date of Patent: Mar. 26, 2019

(54) MODIFICATIONS FOR PNEUMATIC POGO STICKS

(71) Applicant: Vurtego, LLC, Mission Viejo, CA (US)

(72) Inventors: Ian Britt, West Covina, CA (US); James Arthur McMullin, Laguna Hills, CA (US)

(73) Assignee: Vurtego, LLC, Mission Viejo, CA (US)

( * ) Notice: Subject to any disclaimer, the term of this patent is extended or adjusted under 35 U.S.C. 154(b) by 0 days.

(21) Appl. No.: 15/621,883

(22) Filed: Jun. 13, 2017

(65) Prior Publication Data

US 2017/0354841 A1     Dec. 14, 2017

Related U.S. Application Data

(60) Provisional application No. 62/349,510, filed on Jun. 13, 2016.

(51) Int. Cl.
| | |
|---|---|
| A63B 25/08 | (2006.01) |
| A63B 21/008 | (2006.01) |
| F16F 9/02 | (2006.01) |
| F16F 9/32 | (2006.01) |
| F16F 13/00 | (2006.01) |
| A63B 21/00 | (2006.01) |

(52) U.S. Cl.
CPC .......... *A63B 21/0087* (2013.01); *A63B 25/08* (2013.01); *F16F 9/0218* (2013.01); *F16F 9/3257* (2013.01); *F16F 13/002* (2013.01); *A63B 2210/50* (2013.01)

(58) Field of Classification Search
CPC .. A63B 25/00; A63B 25/08; A63B 2208/0204
USPC ........................... 472/134–135; 482/77, 112
See application file for complete search history.

(56) References Cited

U.S. PATENT DOCUMENTS

| | | | |
|---|---|---|---|
| 7,011,608 B2* | 3/2006 | Spencer | A63B 25/08 482/112 |
| 2002/0158379 A1* | 10/2002 | Chen | A63B 25/08 267/64.17 |

* cited by examiner

*Primary Examiner* — Kien Nguyen
(74) *Attorney, Agent, or Firm* — Knobbe Martens Olson & Bear LLP

(57) ABSTRACT

Embodiments of the present disclosure relate to pneumatic pogo sticks having features that allow for the jumping and/or landing characteristics of the pogo stick to be varied. These characteristics may even be modified by a user during use. For example, the housing of the pogo stick may have multiple air chambers and air may be selectively transferred between the multiple air chambers. The transfer of air may change the volume, air pressure, compression ratio, and spring-characteristics of the one or more air chambers in which air is compressed during the compression stroke of the pogo stick. These changes will affect the jumping and/or landing characteristics of the pogo stick and in some cases may allow the user to obtain a greater jump height. At the same time, these features may also allow the pogo stick to be collapsed so that it can be easily stored, packaged, and transported.

20 Claims, 11 Drawing Sheets

MODIFICATIONS FOR PNEUMATIC POGO STICKS

CROSS-REFERENCE TO RELATED APPLICATIONS

This application claims the benefit of U.S. Provisional Application No. 62/349,510, filed Jun. 13, 2016. Each of the above applications is hereby incorporated by reference in its entirety.

TECHNICAL FIELD

The present invention generally relates to pogo sticks, and more specifically to pneumatic pogo sticks.

BACKGROUND

A conventional pogo stick utilizes a coil spring within a hollow tube housing to create an upward force when compressed by a user to propel the user in an upward direction. In order to get more lift than can be provided with a coil spring and without increasing the weight of the pogo stick itself, it has been recognized in the art that an air filled cylinder/piston arrangement can produce increased propulsion or lift for the same length of stroke. Some have gone so far as incorporating engine power in order to increase lift and provide a powered jumping stick.

Various attempts have been made in the art to provide pneumatic pogo sticks. One example of an air-type pogo stick includes a cylinder to which foot-boards are attached in a body. The cylinder has a valve through which a user can regulate the space within the cylinder. The pogo stick is simultaneously worked by both pressure power and vacuum power created in the upper and lower part of the piston in the cylinder respectively when exerted by an outside force. Such a pogo stick, however, has many shortcomings in both construction and functionality and fails to address many of the problems encountered when attempting to use compressed air as a spring.

Pogo stick users have creatively learned to do pogo stick tricks while they are propelled upward. Extreme tricks are common now in many official sports, such as snowboarding, skateboarding, and extreme motorsports, and many users have implemented extreme tricks on pogo sticks. Thus, it would be advantageous to provide a pneumatic pogo stick that allows for relatively smooth jumping and landing while allowing the user to obtain greater height to have more hang-time for more creative and complicated tricks.

However, the jumping and landing characteristics of a pogo stick may greatly affect the overall usability, flexibility, and safety of the pogo stick. For example, the different tricks performed by a user may involve varying degrees of height and hang-time. Certain complex tricks may require greater height, while simpler, repetitive tricks may best be performed with reduced height. As another example, the pogo stick may be used for transportation purposes over a variety of environments. Certain environments may require greater height and hang-time (e.g., there is an obstacle which needs to be jumped over), while other environments may best be traversed with reduced height or smoother jumping/landing. Thus, it would be advantageous to provide a pneumatic pogo stick with variable jumping and/or landing characteristics, including the height of the jump obtainable by a user, such that the user could tailor the use of the pogo stick for specific scenarios (e.g., executing a specific trick or traversing a specific type of environment). It would be especially advantageous if the pneumatic pogo stick allowed for the user to dynamically change those jumping and landing characteristics during use, such that the user could seamlessly use the pogo stick in a variety of scenarios that arise.

Conventional pogo sticks utilizing a coil spring may be taken apart and reassembled by a user for transportation and storage. In comparison, the cylinder of pneumatic pogo sticks is generally designed to trap the air that provides spring-like functionality when compressed. This may make it difficult or impractical for a user to take apart and reassemble some pneumatic pogo sticks without affecting the functionality of the cylinder. As a result, such pneumatic pogo sticks may have problems associated with transportation and storage that do not exist for conventional pogo sticks. Thus, it would also be advantageous to provide a pneumatic pogo stick that is easily transported and stored.

SUMMARY OF THE DISCLOSURE

The systems, methods and devices described herein have innovative aspects, no single one of which is indispensable or solely responsible for their desirable attributes. Without limiting the scope of the claims, some of the advantageous features will now be summarized.

This disclosure relates to embodiments of pneumatic pogo sticks and modifications to pneumatic pogo sticks that provide for relatively smooth jumping and/or landing, while allowing a user to obtain greater height. The disclosure also relates to embodiments of pneumatic pogo sticks and modifications to pneumatic pogo sticks that allow for changing the jumping and/or landing characteristics of the pogo stick, which also affects the height achieved by a user of the pogo stick. These characteristics may even be modified by a user during use. For example, the housing of the pogo stick may have multiple air chambers and air may be selectively transferred between the multiple air chambers. The transfer of air may change the volume, air pressure, compression ratio, and spring-characteristics of the one or more air chambers in which air is compressed during the compression stroke of the pogo stick. These changes will affect the jumping and/or landing characteristics of the pogo stick and in some cases may allow the user to obtain a greater jump height. At the same time, these features may also allow the pogo stick to be collapsed so that it can be easily stored, packaged, and transported.

In some embodiments, the pogo stick may comprise a housing, a sliding shaft, and a piston. The piston may be connected to the sliding shaft and the sliding shaft may be disposed in the housing. The housing may have one or more chambers.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Like reference numbers and designations in the various drawings indicate like elements. Not all of the elements of the drawings are in to scale relate to other drawings and the comparative size of one element relative to another element in the drawings is not necessarily indicative of the relative sizes of the elements in one or more embodiments.

DETAILED DESCRIPTION OF SPECIFIC EMBODIMENTS

Figure 1:
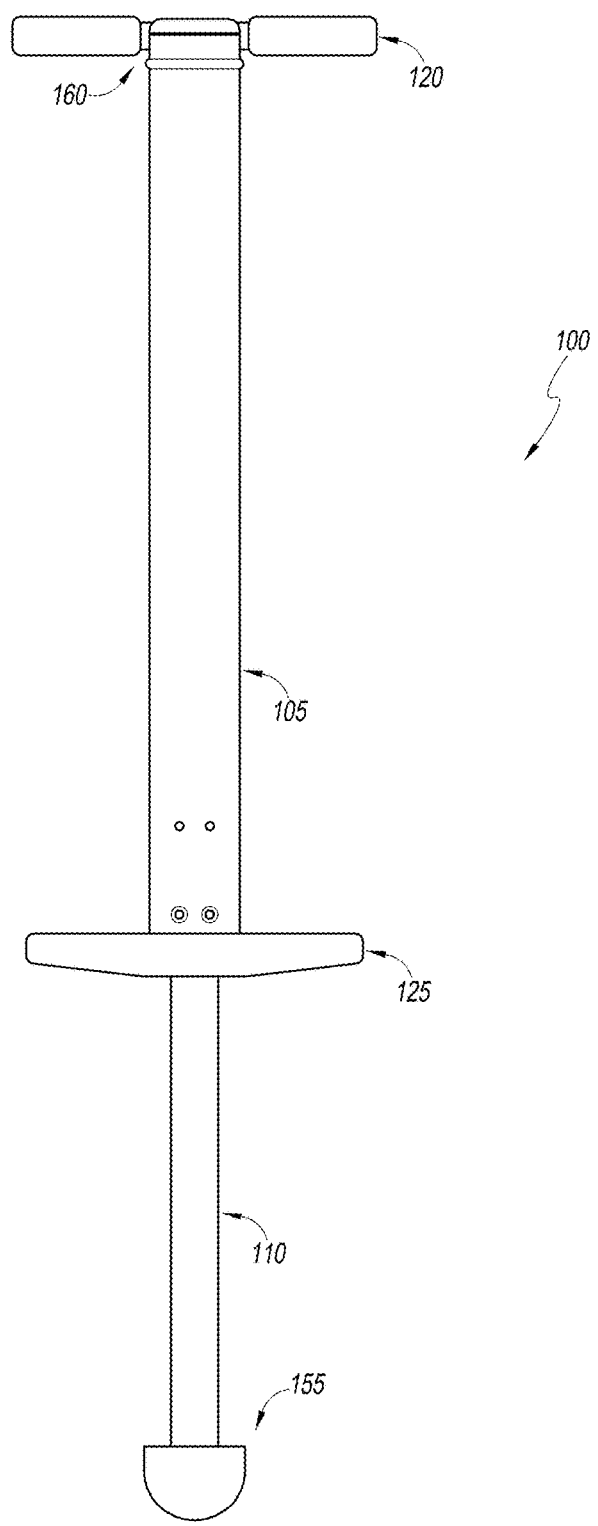
FIG. 1 shows a side elevational view of an embodiment of a pneumatic pogo stick.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure. For example, a system or device may be implemented or a method may be practiced using any number of the aspects set forth herein. In addition, such a system or device may be implemented or such a method may be practiced using other structure, functionality, or structure and functionality in addition to or other than one or more of the aspects set forth herein. Elements that are described as "connected," "engaged," "attached," or similarly described, shall include being directly and/or indirectly connected, engaged, attached, etc. Alterations and further modifications of the inventive features illustrated herein, and additional applications of the principles of the inventions as illustrated herein, which would occur to one skilled in the art and having possession of this disclosure, are to be considered within the scope of the invention.

Descriptions of unnecessary parts or elements may be omitted for clarity and conciseness, and like reference numerals refer to like elements throughout. In the drawings, the size and thickness of layers and regions may be exaggerated for clarity and convenience.

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description" one will understand how illustrated features serve to explain certain principles of the present disclosure.

Figure 2:
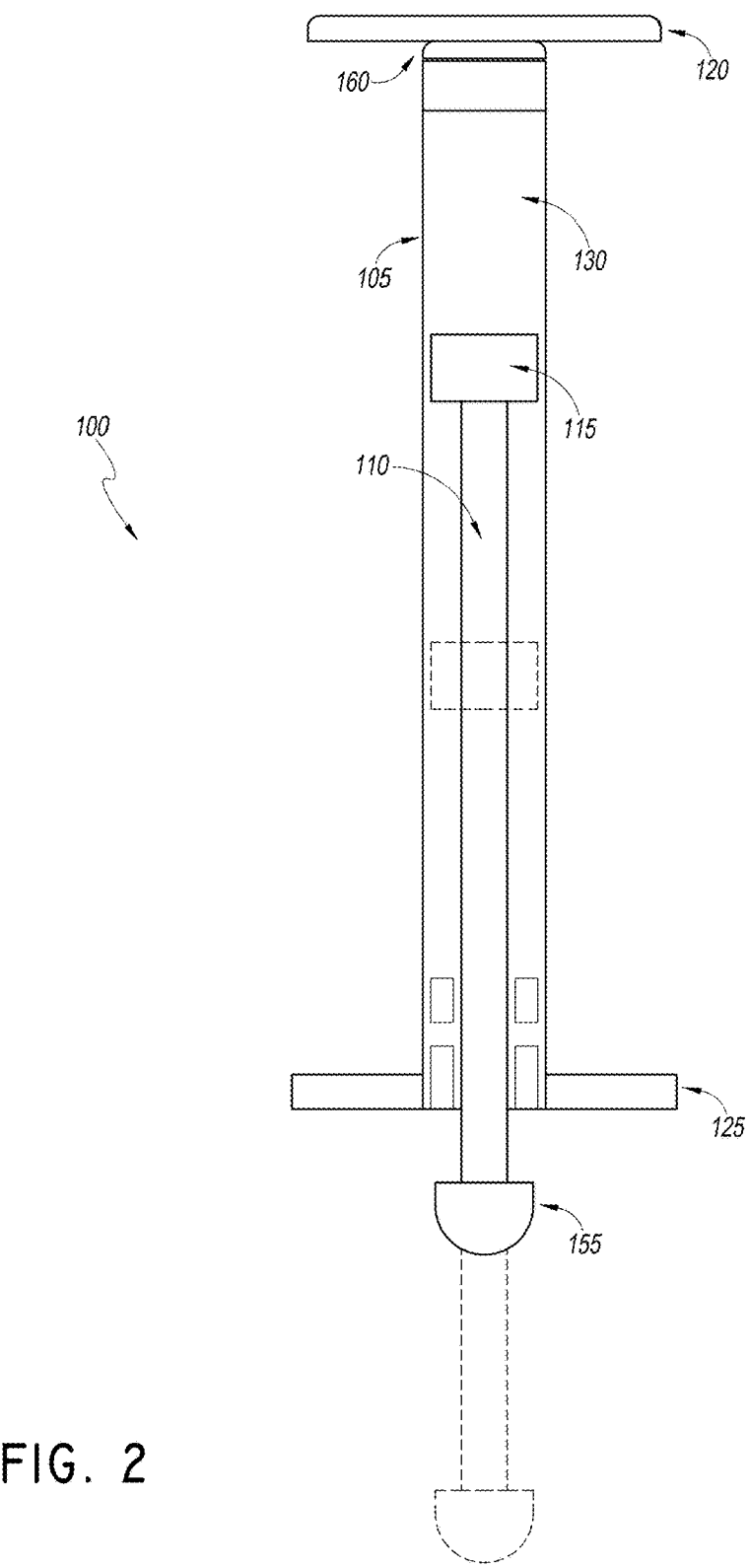
FIG. 2 shows a side elevational cross-section view of an embodiment of a pneumatic pogo stick.
Figure 3:
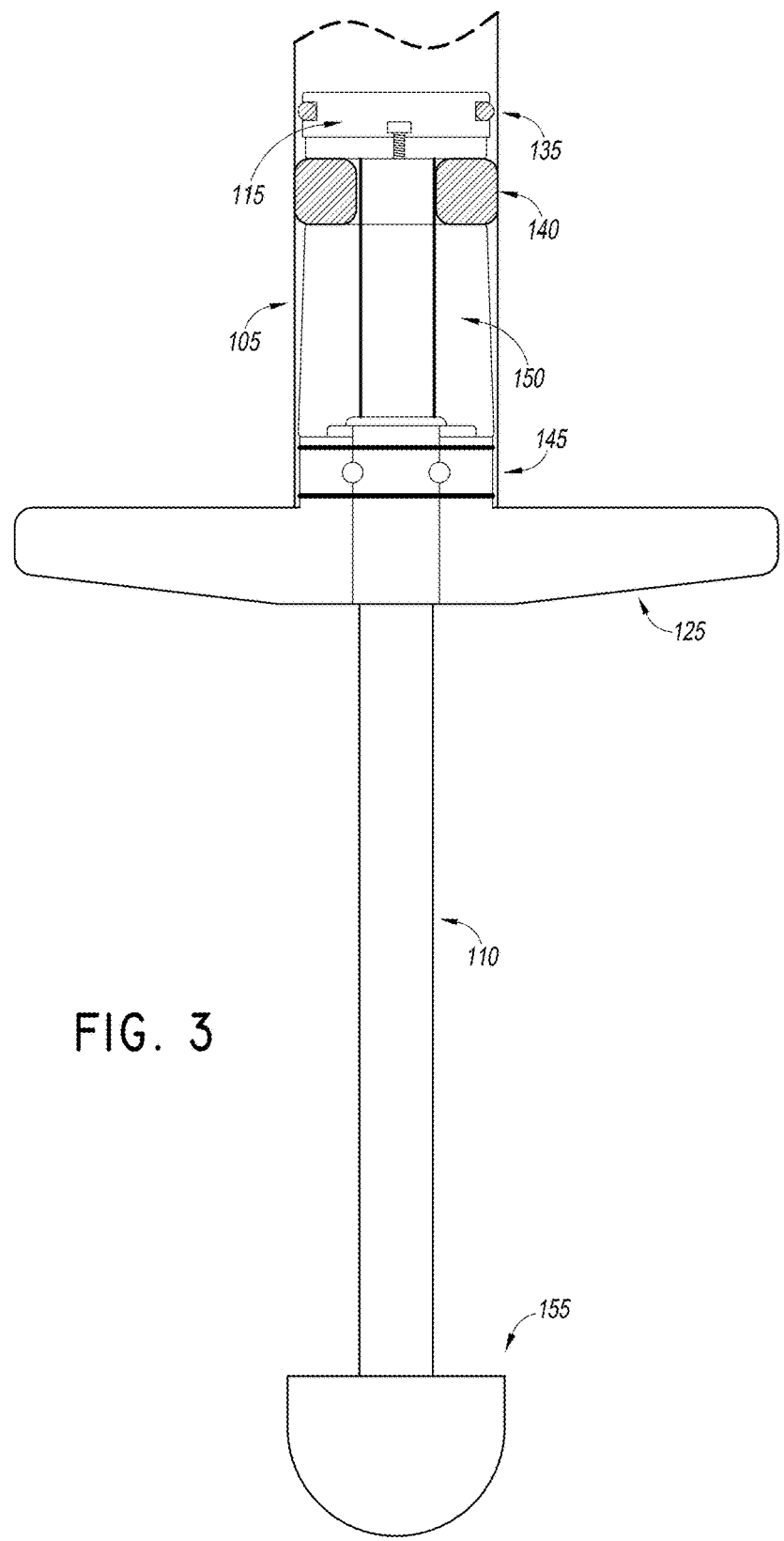
FIG. 3 shows a side elevational cross-section view of at least a piston in one embodiment of a pneumatic pogo stick.

Introduction to Pneumatic Pogo Sticks (FIGS. 1-3)

As previously mentioned, this disclosure relates to pneumatic pogo sticks that are capable of providing additional propulsion and lift over traditional pogo sticks. Some examples of such pneumatic pogo sticks are provided in U.S. Pat. No. 7,011,608, titled "PNEUMATIC POGO STICK", and filed Oct. 21, 2002, which is incorporated by reference in its entirety for all purposes here. That reference discloses an invention having a body that acts as a pneumatic spring, which includes an air cylinder and a piston, with user graspable handles attached or coupled relative to the top of the cylinder, and an elongated shaft attached to the bottom of the piston. The body may also have attached foot supports which allow a user to ride the pogo stick. The piston may be attached to a shaft which contacts a surface, so that stepping or jumping on the foot supports pushes the piston inward, compressing the air inside the cylinder. This compressed air acts like a spring creating a force on the piston and storing kinetic energy as potential energy. The potential energy is then converted back into kinetic energy as the compressed air forces the piston and attached shaft outwards, which in turn propels the body of the pogo stick upwards along with the user. Thus, the pneumatic pogo stick utilizes an air cylinder in the place of a coil spring within a housing, which allows the pneumatic pogo stick to have a higher energy-to-weight ratio than a comparable coil spring pogo stick.

FIGS. 1-3 are provided in order to help facilitate a better understanding of some of the components in a pneumatic pogo stick and some of the design considerations that affect the compression ratio. It should be noted that FIGS. 1-3 only show an example embodiment of a pneumatic pogo stick and are intended to be non-limiting; the inventions disclosed herein may be applicable to other examples of pneumatic pogo sticks and not just ones having the configurations shown. FIG. 1 shows a side elevational view of an embodiment of a pneumatic pogo stick, while FIG. 2 shows a side elevational cross-section view of an embodiment of a pneumatic pogo stick. FIG. 3 shows a side elevational cross-section view of at least a piston in one embodiment of a pneumatic pogo stick.

As shown in FIGS. 1 and 2, a pneumatic pogo stick 100 may comprise a main tube or housing 105, a sliding shaft 110, a piston 115, a handle 120, and foot rests 125. The sliding shaft 110 may generally be configured to move in and out of the housing 105 in a longitudinal direction. In some embodiments, the longitudinal direction of the movement of the sliding shaft 110 may be substantially parallel to the longitudinal axis of the housing 105. A handle 120 may be connected to the top of the housing 105. The handle 120 may serve the purpose of allowing a user to grip the pogo stick 100. Foot rests 125 may provide a location on which a user can stand. In some embodiments, the housing 105 comprises a generally cylindrical shape, although the housing 105 may comprise other shapes such as frustoconical, square, hexagonal, octagonal, or other similar shape. The sliding shaft 110 may comprise a generally cylindrical shape, or some other shape, such as square, hexagonal, octagonal, or some other shape. The handle 120 and/or foot rests 125 may be temporarily or permanently attached to the housing 105.

In some embodiments, the pneumatic pogo stick 100 is used by a user gripping the handle 120 and stepping onto the foot rests 125, and then moving in an up-and-down motion.

As the user and the pogo stick 100 impact the ground, the sliding shaft 110 may have a tendency to slide up and into the housing 105. In some embodiments, the space within the housing above the piston 130 is reduced. If air or another gas is trapped in that confined space 130, the pressure of that gas may increase. The increase in pressure may store potential energy, which may exert a force on the top of the piston 115 pushing down, as well as on the top of the housing 105 pushing up. When the sliding shaft 110 is inserted into the housing 105, the user may push down on the foot rests 125 simultaneously to the gas pushing up on the top a housing 105, which may help propel the user and pogo stick 100 in a generally upward direction. This process may be repeated more than once, and may be repeated indefinitely.

The housing 105 may comprise PVC, polycarbonate, metal, plastic, or other material, and may be created through casting, extruding, welding, or other various manufacturing techniques. The wall thickness of the housing 105 may be between a few millimeters and one or more centimeters thick. In some embodiments, it may be advantageous for the housing 105 to be lightweight, and this may be accomplished using generally lightweight materials and/or a thinner wall thickness.

With reference to FIG. 3, the piston 115 may comprise a device which substantially interacts with the inside wall of the housing. In some embodiments, a gasket or seal 135 may be present which may help prevent gases from moving around the piston 115, for example from the confined space 130 to below the piston 115. The piston 115 may form various shapes depending on the application. A bumper 140 may be disposed below the piston 115 and above a bushing 145, such that when the sliding shaft 110 extends out from the housing 105, the bottom of the piston 115 may impact or contact the bumper 140. The bumper 140 may serve the function of limiting the travel of the sliding shaft 110 and/or piston 115, and may help prevent damage to any of the parts. The bumper 140 may comprise rubber, plastic, nylon, or other various materials that may serve the function of limiting the motion of the sliding shaft 110 and/or piston 115, and prevent any of the moving parts from damage. Further, a spacer 150 may be disposed between the bumper 140 and the bushing 145. The spacer 150 may comprise plastic, nylon, or other various materials.

In some embodiments, a bushing 145 may be disposed at the bottom of the housing 105 near the foot rests 125, and below the bumper 140 and/or spacer 150. When the sliding shaft 110 is fully extended, the bumper 140 may be disposed between the bottom of the piston 115 and the top of the bushing 145. The bushing 145 may comprise an aperture through which the sliding shaft may travel. The bushing 145 may help keep the sliding shaft 110 aligned, such that the sliding shaft 110 does not rotate coaxially to the housing 105. For instance, the cross-section of the sliding shaft 110 may be generally square, and the aperture in the bushing 145 may also be square. This configuration may prevent the sliding shaft 110 from substantially spinning around or turning. The bushing 145 may also help prevent the sliding shaft 110 from rotating about an axis perpendicular to an axis of the housing 105. The bushing 145 may comprise a metal or other generally rigid material, and may define an aperture through which the sliding shaft 110 may travel. The bushing 145 may be temporarily or permanently attached to the housing, and in some instances may be pressed fit to the housing 105. For instance, as a non-limiting example, when the user and the pogo stick 100 are impacting a surface, the sliding shaft 110 may be in a fully extended position and have maximum exposure outside of the housing 105. If the user and the pogo stick 100 do not land in an exactly vertical direction, the force of the ground on the sliding shaft 110 may not be parallel to the direction of travel of the user and the housing 105. In such an instance, the housing 105 may have a tendency to rotate about an axis generally horizontal and may place a bending force on at least part of the sliding shaft 110. It may be advantageous to reinforce the sliding shaft 110 with a bushing 145 in order to resist this bending force.

In some embodiments, the sliding shaft 110 may comprise a bounce pad 155 at the bottom of the shaft 110, and may generally contact the surface or ground upon which the pogo stick 100 is used. The bounce pad 155 may comprise a plastic, rubber, or other material. The bounce pad 155 may serve the purpose of gripping the ground surface, such that upon impact, the bounce pad 155 and/or sliding shaft 110 do not slip out from under the user. Additionally, the bounce pad may distribute the impact force of the pogo stick over a larger area on the ground, to reduce the chance of the pogo stick compressing the ground underneath it and/or prevent the user from being caught and/or rolled over by surface imperfections or protrusions (e.g. potholes, plant roots, manholes). As such, a material may be chosen for the bounce pad that has a high degree of static friction with various surfaces the pogo stick may be used on. Additionally, the bounce pad 155 may help insulate the user from vibration or other forces. The bounce pad 155 may be attached to the sliding shaft 110 using glue, screws, bolts, or other various attachment methods.

In some embodiments, the top of the housing 105 may be sealed by a cap 160 that may be temporarily or permanently attached to the housing 105. The cap 160 may be attached using bolts, adhesives, chemicals, welding, or other attachment methods. The cap 160 may comprise a valve (not shown) through which gases may be inserted into the housing 105. The handles 120 may also be attached to the housing 105 and/or the cap 160, such that use of the handles 120 by the user to hold onto the pogo stick device 100, may not generally dislodge the handles 120 from the device.

In some embodiments, the sliding shaft 110 generally travels into and out of the housing 105, beginning at a maximum extension, and ending at a maximum compression. The maximum extension may be defined as the configuration when the sliding shaft 110 is slid out of the housing 105 as far as, or nearly as far as, the sliding shaft 110 can travel. Maximum compression may be defined as the configuration when the sliding shaft 110 is disposed into the housing as far as, or nearly as far as, possible. Thus, a compression stroke may comprise the sliding shaft 110 moving from the maximum extension position to the maximum compression position. In these configurations, the volume of space 130 may comprise the volume above the piston 115, and below the cap 160, that is confined within the housing 105. In some embodiments, the volume of space 130 may comprise a gas, air, or specific gases such as nitrogen. Various gases may confer different advantages; for example, air is easily available, whereas pure nitrogen may allow for reduced diffusion through rubber seals support and reduced moisture (thus inhibiting the onset of destructive corrosion processes within the cylinder during prolonged storage).

The fluid within volume of space 130 may be referred to as working fluid. Different gases at different pressures may be advantageous. For instance, as a non-limiting and illustrative example, the volume of space 130 may be filled with gas at a pressure higher than atmospheric pressure.

The interaction between the piston 115, volume of space 130 and housing 105 may be described as a process similar to an adiabatic compression-expansion cycle, or an isothermal compression-expansion cycle, of the piston 115 working on a reservoir formed by volume of space 130. It will be appreciated that both adiabatic expansion, assuming no heat transfer between volume of space 130 and ambient, and isothermal expansion, assuming thermal equilibrium between volume of space 130 and ambient, are idealized concepts that may aid understanding of the behavior of the system, but may not be entirely accurate; other thermodynamic processes may also occur, causing the system to deviate from these idealizations. Such other processes include friction between the piston 115 and surrounding contact areas, finite heat transfer between volume of space 130 and ambient, and mass transfer due to imperfect sealing between volume of space 130 and ambient. Based on the quality of the thermal interface between volume of space 130 and ambient, the isothermal model, the adiabatic model, or a combination of the two models may be better suited to describe the behavior of a given design.

During the compression phase of the cycle, piston 115 exerts work by compressing the working fluid (e.g. air, nitrogen, etc.) in volume of space 130, reducing its volume. Because volume of space 130 is substantially sealed from the ambient atmosphere, pressure and/or temperature inside volume of space 130 rise. During the expansion phase, the working fluid in volume of space 130 expands in volume while exerting work on piston 115, reducing its pressure and/or temperature.

In some embodiments, the pneumatic pogo stick may be associated with a compression ratio. The compression ratio may be defined as the ratio of the working fluid from its largest volume to its smallest volume. Alternatively, the compression ratio may be defined as the ratio of the volume between the piston and cylinder head before and after a compression stroke, when the piston travels from the maximum extension position to the maximum compression position. Thus, the compression ratio may vary due to a great number of factors, which include the stroke length of the sliding shaft, the dimensions of the housing, the geometry of the piston, etc.

As shown in the figure, the compression ratio may be defined as the volume of space 130 when the sliding shaft 110 is at an extension position divided by the volume of space 130 when the sliding shaft 110 is at a compression position. For instance, if the volume of space 130, when the sliding shaft 110 is an extension position is 20 in.$^3$, and the volume of space 130, when the sliding shaft 110 is at a compression position is 5 in.$^3$, then the compression ratio is 20÷5, or 4. This compression ratio may be, therefore, a function of at least the stroke length of the sliding shaft 110, the volume of space above the piston 130 at the extension position, and the volume of space above the piston 130 at the compression position. The compression ratio may also be related to the diameter of the housing 105 and the length of the housing 105.

Unlike traditional pogo sticks, pneumatic pogo sticks may be affected by a "hammering" effect that is caused by the pressure inside the compression chamber increasing rapidly due to too high of a compression ratio. This may be viewed as the cylinder pressure rising more sharply towards the end of the compression phase as compared to the onset of compression. From a thermodynamic perspective, this effect may be associated with the adiabats or isotherms sloping more steeply as volume decreases; in other words, it requires more energy to compress a fluid that has already been highly compressed to a tight volume, as compared to the same fluid that is thinly distributed over a large volume. This effect may be comparable to hammering occurring in water pipes when a fluid in motion is forced to stop or change direction suddenly causing a large momentum change. When "hammering" happens on a pogo stick, the sudden change in pressure inside the chamber may also cause problems for the pogo stick user and affect the bounce/ride quality of the pogo stick. This "hammering" effect can be reduced by lowering the compression ratio. Because the compression ratio is associated with the amount of energy stored in a given working volume of the cylinder (and thus the ability of the pogo stick to release that energy for the next jump), a design is desirable which mitigates the hammering effect while not unduly affecting energy storage capacity of the pogo stick.

There are many different ways of lowering the maximum compression ratio. Some examples are provided in U.S. patent application Ser. No. 14/789,809, titled "PISTON CONFIGURATIONS FOR PNEUMATIC POGO STICK", and filed on Jul. 1, 2015, which is incorporated by reference in its entirety for all purposes herein. The reference discloses improvements to the piston and air shaft of pneumatic pogo sticks that allow for reduced hammering and a lower compression ratio in order to provide relatively smooth jumping and landing while propelling a user to greater heights. Some non-limiting examples of such improvements include changing the stroke length such that at maximum compression the sliding shaft 110 is not disposed as far into the housing 105, changing the shape/structure of the piston within the air cylinder, and utilizing a hollow shaft in order to increase the volume of space above the piston 130 at maximum compression.

With the general structure and operation of pneumatic pogo sticks now established, the remainder of this disclosure relates to features of pneumatic pogo sticks that further reduce the compression ratio to allow for relatively smooth jumping and landing, while allowing the user to obtain greater height to have more hang-time. The disclosure also relates to features of pneumatic pogo sticks that allow for a user to vary the jumping and/or landing characteristics of the pogo stick (e.g., by changing the compression ratio), and features that allow a user to dynamically modify the jumping and/or landing characteristics of the pogo stick during use. Finally, the disclosure also relates to features of pneumatic pogo sticks that allow the pogo stick to be easily transported, packaged, and stored.

Multiple Air Chambers (FIGS. 4-11)

Generally, providing additional air storage to the pogo stick may increase the energy-to-weight ratio of the pogo stick to allow for greater heights, as well as lower the compression ratio which may dictate the bounce quality of the pogo stick. A simple way to provide additional air storage is to change the shape of the housing, or to increase dimensions of the housing, in order to increase the volume of the portion of the housing that holds the air.

However, changing the shape of the housing may be an impractical option. Although the housing can be any shape, a shape having a circular cross section may be preferable. Edges or corners in the housing tend to concentrate stress or vibration, and that increased stress concentration may lead to failure at those points. Furthermore, shapes with circular cross sections provide the housing with high cross sectional area for a given amount of material used to make the housing. Thus, in some embodiments (such as the housing 105 shown in FIGS. 1-3), the housing of a pneumatic pogo stick will be generally cylindrically-shaped, which has a circular cross section in at least one dimension—reducing the chances of failure in the housing material. In some of such embodiments, the housing may be referred to as the cylinder or air cylinder, as a reference to the general shape of the housing.

Accordingly, increasing the height and/or diameter of the cylinder may increase the volume of the housing and allow for additional air storage within the pogo stick. This may translate into an increase in the energy-to-weight ratio of the pogo stick and/or reduction of the compression ratio necessary to store a given amount of energy. However, the changes in the energy-to-weight ratio, the compression ratio, and the bounce quality would be permanently reflected in the pogo stick. In other words, simply making the housing bigger may result in a pogo stick that jumps higher, but would not allow the user to change or alter the jumping and landing characteristics of the pogo stick at any point. Those characteristics of the pogo stick would be fixed once the pogo stick is manufactured. Additionally, a pogo stick may be desired not to exceed a given size for reasons unrelated to energy storage In order to provide a user the ability to vary the jumping and/or landing characteristics of the pogo stick, embodiments of pneumatic pogo sticks are disclosed in which air is stored in multiple air chambers within the housing, or allow for air to be transferred between those multiple chambers. This represents a significant improvement over a single, closed air chamber since the use of multiple chambers allows for the jumping and/or landing characteristics of the pogo stick to be dynamically changed.

The housing may contain one or more air chambers; any number of air chambers may be used and individual air chambers may be of any shape and size. Individual air chambers may hold air at different pressures, such that the pressure of the air varies throughout the housing rather than the singular, uniform pressure that would be associated with a single air chamber. Air chambers in the housing may also be fluidly connected to each other in various ways, such as the use of openings, valves, gates, inlets, and so forth. The air chambers in the housing may be arranged in any manner and not just the arrangements discussed herein.

In some embodiments, there may be one or more chambers that make up a "main chamber" that is used for holding the air used as a spring in a compression stroke. The main chamber may determine the compression ratio, and thus the jumping and landing characteristics of the pogo stick, for that compression stroke. In some of such embodiments, the individual chambers that make up the main chamber may change between compression strokes. For example, the main chamber may include additional chambers in order to increase the total volume of the main chamber, or the main chamber may include fewer chambers in order to decrease the total volume of the main chamber.

There may also be one or more chambers that make up additional one or more additional or secondary "reservoirs" that is used for holding any of the air that is not used as a spring in a compression stroke. However, there may also be one or more additional reservoirs in the pogo stick. For example, there may be one chamber at the top of the housing and another chamber towards the bottom of the housing that are both not being used to store potential energy during the compression stroke. Both of these chambers may be considered reservoirs. In some embodiments, the individual chambers that make up a reservoir may change between compression strokes. For example, the reservoir may include additional chambers in order to reduce the total volume of the main chamber, or the reservoir may include fewer chambers in order to increase the total volume of the main chamber.

In some embodiments, the pogo stick may have features that allow air to be transferred from a reservoir to the main chamber. In some embodiments, the pogo stick may have features that allow air to be transferred from the main chamber to a reservoir. For example, there may be one or more valves between the reservoir and the main chamber, through which air can move from the reservoir into the main chamber or from the main chamber into the reservoir. In some embodiments, the valve may be a two-way valve. In some embodiments, the valve may be a one-way valve that allows air to be transferred in only one direction (e.g., only permitting air to flow from the reservoir to the main chamber, or only permitting air to flow from the main chamber to the reservoir).

In some embodiments, the user of the pogo stick may be able to control the relative pressure between a reservoir and the main chamber. For example, the user may be able to operate a valve between the reservoir and the main chamber, in order to transfer air from the reservoir to the main chamber or from the main chamber to the reservoir. There may be a button located on the pogo stick that allows the user to operate the valve. This valve may be operable while the user is riding the pogo stick, so that the user may change the characteristics of the pogo stick any time during its use.

In some configurations, a single valve on its own may tend to equalize the pressure between the reservoir and the main chamber. Thus, how the jumping and landing characteristics of the pogo stick change would depend on the relative pressure between the reservoir and the main chamber prior to its use. Take for example, a valve that permits air to flow from the reservoir into the main chamber. If the pressure is higher in the reservoir than in the main chamber, air would flow from the reservoir into the main chamber until the pressure equalizes. If additional air is flowing into the main chamber while its volume remains the same, the pressure in the reservoir would decrease while the pressure in the main chamber increases. This would affect the energy released during expansion of the fluid in the main chamber and may thus result in higher jumps due to the increased rebounding force.

Additionally, the use of one or more valves may effectively partition the working volume of the fluid into several smaller volumes, and thus allow for a more linear change of pressure during the compression and/or expansion cycles. Advantageously, this may contribute to alleviating the "hammering" effect.

As another example, consider a valve that permits air to flow from the main chamber into the reservoir. If instead, the pressure is higher in the main chamber than in the reservoir, then air would flow from the main chamber into the reservoir until the pressure equalizes. This would decrease the pressure within the main chamber and may thus tend to lower the energy released during expansion, resulting in lower jumps.

The ability to transfer air from the main chamber into a reservoir (e.g., via a valve) may be particularly useful for transporting, packing, and/or maintaining the pogo stick. For example, one or more reservoirs may be used as a storage tank that allows the air within the main chamber to be emptied. The reservoirs could form a unitary volume, or they may form separate volumes. For example, the storage tank could include multiple reservoirs that are not connected to each other (e.g., one reservoir is at the top of the housing with another reservoir at the bottom of the housing). By themselves, valves may allow for the transfer of air from the main chamber into the storage tank up to equilibrium (e.g., the point that the pressures within the main chamber and the storage tank are equivalent), and then air would no longer be transferred.

However, in some embodiments the fluid may be actively transferred from the main chamber into the storage tank. For example, the fluid transfer could be paired with the compression stroke of the pogo stick. A user may be able to bounce on the pogo stick, which would decrease the volume of the main chamber and compress the air inside the main chamber, leading to an increase in pressure in the main chamber. This would force air from the main chamber into the storage tank. If the shaft is inserted and the valve is closed, substantially all of the fluid would be in the storage tank. The pogo stick would be in a collapsed configuration and remain in this collapsed configuration without substantial amounts of fluid leaving the pogo stick. In this collapsed configuration, the pogo stick could be easily stored, packaged, and transported. This would allow the pogo stick to be shipped with only air (or other fluid) in the storage tank. This implementation may be advantageous over a design in which fluid leaves the pogo stick (e.g., the fluid is released from the housing), since it keeps the pogo stick as a substantially sealed or closed system and improves the reliability, consistency, and predictability of the pogo stick. This implementation also allows for gaseous mixtures other than air to be used within the pogo stick without concern about how those gases would be replenished.

When the user wishes to use the pogo stick again, fluid can be transferred back from the storage tank into the main chamber to take the pogo stick out of the collapsed configuration. In some embodiments, the pogo stick may have a feature that allows the volume of the storage tank to be decreased to transfer additional air from the storage tank into the main chamber. In some embodiments, the shaft of the pogo stick may be used as a pump to create air pressure within the storage tank and force additional fluid into the main chamber from the storage tank.

In some embodiments, there may be two valves: one that allows air to flow from the main chamber into the storage tank, and another one that allows air to flow from the storage tank into the main chamber. By using a regulator, air can be transferred from the storage tank to the main chamber, thus increasing the pressure in the main chamber which results in higher pressure, which may lead the user experiencing a stiffer rebound. Advantageously, this may allow the pogo stick to be easily adjusted to users of different body weight, ride skill, and preferences.

In some embodiments, a reservoir (or a storage tank) can be used to hold air at a very high pressure that can be selectively transferred to the main chamber. For example, there may be a button on the pogo stick that a user may press that causes the air in the reservoir to be dumped into the main chamber. For instance, pressing the button could open a valve between the reservoir and the main chamber. This would increase the air pressure within the main chamber and increase the jump height of the pogo stick, for at least a few jumps. In some cases, this could allow for at least a few really big jumps. Thus, a user riding the pogo stick could hit the button in order to achieve additional height on their jumps. There may be a way that air can be moved back into the reservoir when the pressure within the main chamber is high enough (e.g., when the piston is being compressed or is fully compressed). For example, there could be a transfer valve that allows air from the main chamber to move back into the reservoir. In some embodiments, the reservoir may be filled by an external source. For example, air or other fluids (e.g. nitrogen) may be transferred into the reservoir, such as through a valve on the housing that leads into the reservoir.

In some embodiments, the characteristics of the pogo stick may be changed by changing the relative volumes of the main chamber and a reservoir (or storage tank). For example, air chambers of the reservoir may become part of the main chamber or, alternatively, air chambers of the main chamber may become part of the reservoir. As a more specific example, consider a main chamber that is one large chamber and connected to a reservoir of two smaller chambers. The main chamber may be fluidly connected to the reservoir. In a compression stroke, the volume of the large chamber will factor into the compression ratio as the air in the large chamber is compressed. However, there may be a feature, such as a gate, that may open up between the main chamber and the reservoir and the gate may stay open during the compression stroke. The two smaller chambers of the reservoir would become part of the main chamber for the compression stroke, so that the total effective volume of the main chamber is greater and increased by the volume of the two smaller chambers. Or, the gate may only permit one of those smaller chambers to freely transfer air with the main chamber, in which case the main chamber would increase in volume by the one smaller chamber to leave a reservoir having the volume of the remaining smaller chamber.

In some embodiments, one or more of the air chambers may be used in combination with a pump in order to build air pressure inside the air chamber(s). The pump may be an external pump or it may be integrated with the pogo stick. For example, with a pogo stick that has a main chamber and a storage tank, there may be a pump built into the storage tank that allows air to be pumped into the storage tank from the main chamber. This allows air pressure to be built up in the storage tank to be later transferred into the main chamber (e.g., in order to increase jump height). In some embodiments, bouncing on the pogo stick may generate air pressure within the storage chamber.

Thus, having multiple air chambers in the housing that allow for the selective transfer of air between the chambers provides a user the ability to vary the jumping and/or landing characteristics of the pogo stick (e.g., by changing the compression ratio). A user may be able to dynamically modify these characteristics during use of the pogo stick (e.g., through the use of a button)—even if they are currently riding the pogo stick. This may allow the user to jump higher, to perform more complex tricks, or to collapse the pogo stick for storage and transportation.

FIGS. 4-11 illustrate an example embodiment of a multi-chambered housing for a pneumatic pogo stick. More specifically, the figures illustrate a double-walled housing, in which a cylindrical housing has chambers that are arranged in a concentric manner, such that the main chamber is an internal cylinder surrounded by one or more reservoirs. The one or more reservoirs that surround the main chamber are coaxial to the main chamber. This arrangement is only an example of how chambers in the housing could be arranged and is intended to be non-limiting. For example, the chambers in the housing could be divided by a wall that runs along a diameter of the cylindrical housing, or the housing could be divided vertically with chambers at the top of the housing, and so forth. The features described herein may be used in any combination with any arrangement of chambers.

Figure 4:
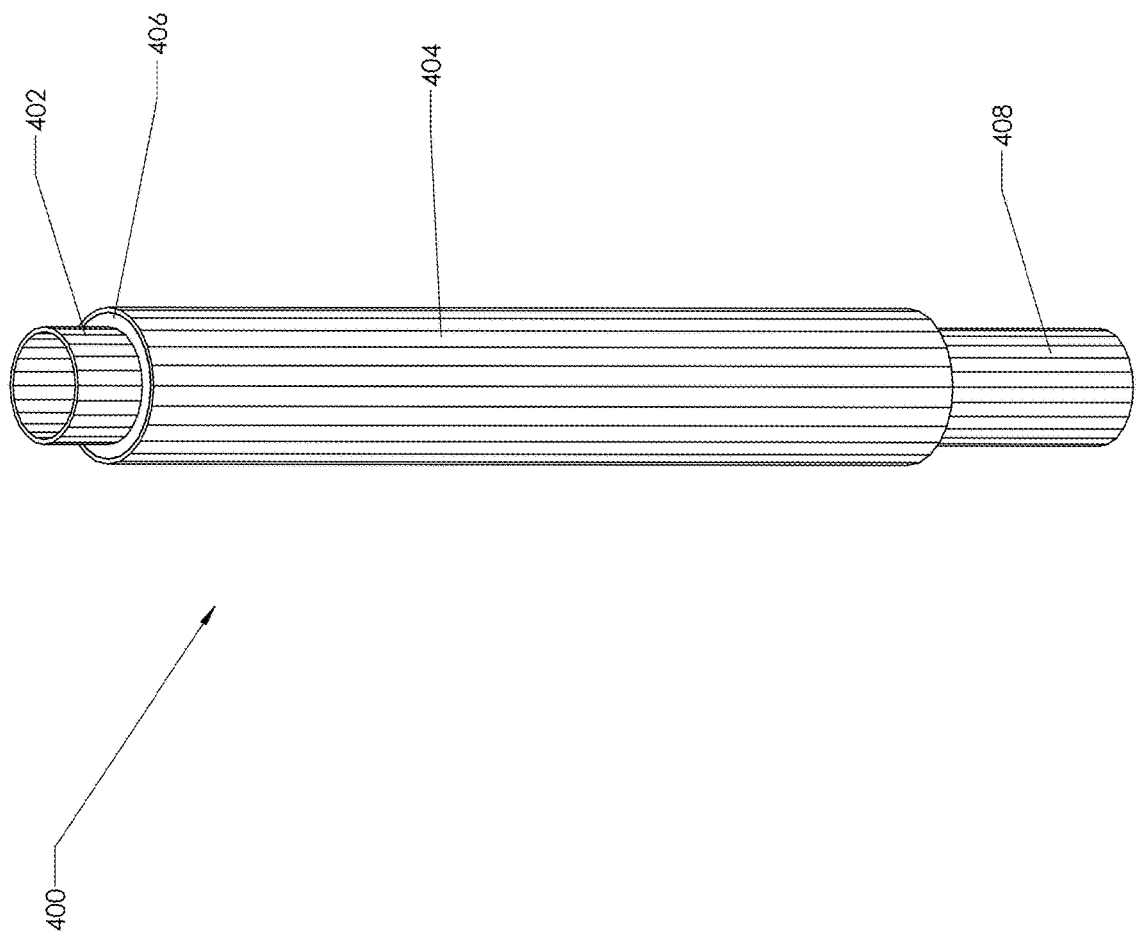
FIG. 4 shows a perspective view of one embodiment of a multi-chambered housing.

FIG. 4 is a perspective view of a double-walled housing.

As shown in the figure, the double-walled housing 400 has an overall cylindrical shape and may have a top portion 402, a middle portion 404, and a bottom portion 408. The middle portion 404 has an outside diameter which is larger than the outer diameter of the top portion 402 and the outer diameter of the bottom portion 408. This increased diameter may provide the necessary volume to accommodate additional air chambers within the housing. The outer diameter of the top portion 402 and the outer diameter of the bottom portion 408 do not need to be the same, but as shown in the figure they are the same. In other embodiments, the double-walled housing 400 may have a generally uniform outside diameter, such that the top portion 402, the middle portion 404, and the bottom portion 408 are indistinguishable.

There may be one or more external rims 406, in which there is a transition in the outer diameter of the double-walled housing 400. As shown, there is an external rim 406 between the top portion 402 and the middle portion 404 in which the outer diameter changes. There is a similar external rim between the middle portion 404 and the bottom portion 408. In some embodiments, a transition in the outer diameter of the double-walled housing 400 may be gradual or tapered.

Figure 5:
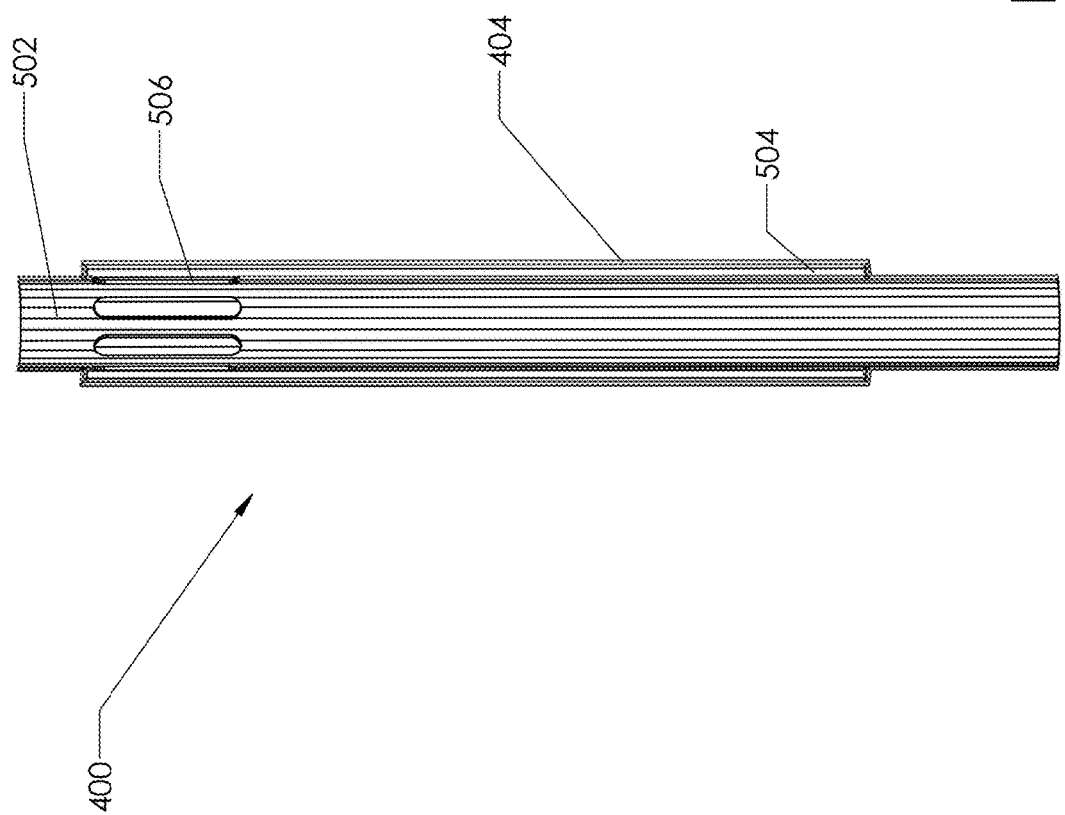
FIG. 5 shows a side cross-section view of one embodiment of a multi-chambered housing.

FIG. 5 is a cross-sectional view of a double-walled housing.

The double-walled housing 400 has an inner wall that runs along the inside of the length of double-walled housing 400. The inner wall may have a circular cross-section and define a cylindrical chamber within the double-walled housing 400. The cylindrical chamber defined by the inner wall 502 may be a main chamber, in which the piston resides. This would be the main chamber 502 in the figure shown.

The inner wall of the main chamber 502 has one or more openings 506, which lead to a reservoir 504 located in the middle portion 404 between the inner wall of the main chamber 502 and the outer wall of the middle portion 404. The reservoir 504 is shown as residing within the middle portion 404, between the external wall of middle portion 404 and the wall formed by top portion 402. Thus, the one or more openings 506 may provide fluid passage for air between the main chamber 502 and the reservoir 504. In this arrangement, the reservoir 504 is coaxial with the main chamber 502 and surrounds the main chamber 502. Thus, the reservoir 504 can be thought of as an "external chamber" and the main chamber 502 defined by the inner wall may be thought of as an "internal chamber". However, in other embodiments, the shape, position, and orientation of the reservoir and the main chamber may be different (e.g., the reservoir is above the main chamber) and thus, could be referred to by different names.

There may be any number of openings 506, and the openings 506 may be of any size. In some embodiments, the openings 506 are instead valves or any other structure that provides valve-like functionality, such as gates, inlets, and so forth. Advantageously, the use of one or more valves (e.g. a check valve) as part of one or more openings 506 may confer various advantages; the valve may open or connect main chamber 502 with reservoir 504 when the pressure differential between them has reached a certain threshold. This may confer various advantageous changes in ride behavior, some of which will now be discussed. For some users, it may be desirable to have a linear or "spring-like" rebound feeling. For example, some users may be used to a spring-powered pogo stick (which may have a rebounding force that follows Hooke's law, e.g. is approximately proportional to the displacement of the spring). Other users may prefer a more linear rebound because they prefer more gradual deceleration and acceleration, e.g. to soften the strain on their joints. Some air-powered pogo sticks may, however, have a superlinear increase in restorative force; for example, the restorative force may follow a power law. By using multiple reservoirs that are appropriately, a region during which the restorative force is approximately linear can be created or expanded.

The threshold for the valve may be determined at manufacturing, or may be adjustable by the user. Advantageously, this may allow the user to adjust the ride feeling to his or her preferences, skill level, body weight, and other factors. For example, a user desiring to learn the use of a pogo stick and thus desiring to only achieve low jump heights may adjust the valve so that it opens at ambient pressure or even below, thus obtaining a low restorative force and a gentle ride. Conversely, an experienced user who desires high jumps may want to adjust the valve to a different setting, e.g. a medium setting, wherein the valve remains open during part of the compression stage, thus making the response of the pogo stick more linear. Some users may desire a particularly stiff or hard ride; such users may desire to set the valve to a position where it remains closed altogether or only opens at particularly high pressure.

Thus, in some embodiments, air may be transferred between the main chamber 502 and the reservoir 504. In some of such embodiments, the air may be selectively transferred between the main chamber 502 and the reservoir 504. For example, compression of the piston within the main chamber 502 may force air into the reservoir 504, so that air can be removed from the main chamber 502 (e.g., to collapse the pogo stick). Alternatively, air from the reservoir 504 may be dumped into the main chamber 502 to increase the pressure within the main chamber 502 and the spring force provided by the air within the main chamber 502. Any combination of the features discussed in this disclosure may be used with this arrangement of air chambers in order to allow the jumping and/or landing characteristics of the pogo stick to be varied, or to provide improved storage and transport of the pogo stick.

Figure 6:
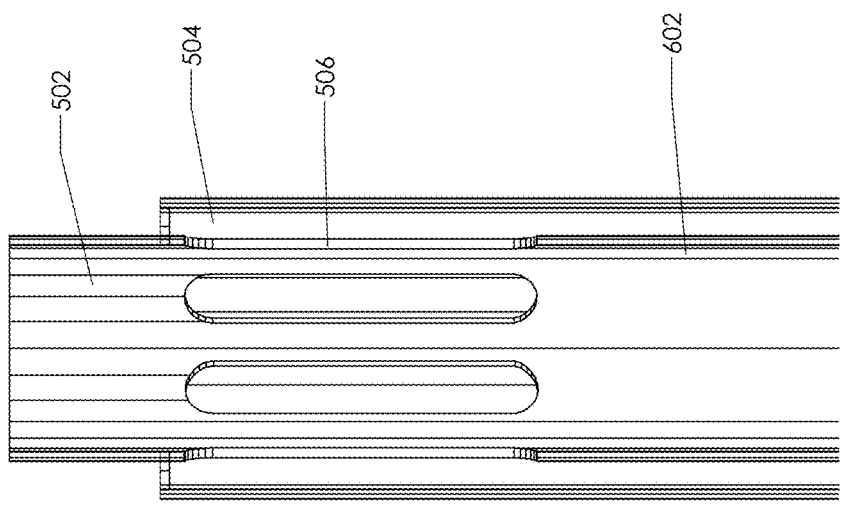
FIG. 6 shows a side cross-section view of one embodiment of a multi-chambered housing.

FIG. 6 is a cross-section view of one embodiment of a double-walled housing. More specifically, the figure illustrates the same double-walled housing 400 shown in FIG. 5, but is zoomed into the top of double-walled housing 400 in order to show additional detail.

Thus, the figure provides a better view of openings 506. It can be seen that there may be more than two openings 506; there may be multiple openings 506 are arranged around the circumference of the inner wall 602 of main chamber 502, which was not clearly visible in the previous figure. These openings 506 lead into the reservoir 504. This figure better illustrates why the housing is referred to as "double-walled", as the inner wall 602 can be clearly seen as being concentric to the outer wall of the middle portion 404 in order to define a space between them that the reservoir 504 resides in.

In other embodiments, the openings 506 may instead be a singular opening in the inner wall 602, and the singular opening may be of any shape. For example, inner wall 602 may have an opening leading into the reservoir 504 that is rectangular, ovular, circular, and so forth. In some of such embodiments, the openings 506 may be a singular opening that wraps around the circumference of the inner wall 602, such that the inner wall 602 is not continuous along the length of the double-walled housing 400 (and is instead divided into two sections). However, a wrap-around opening may sacrifice some of the structural rigidity provided by the inner wall 602 and place additional stress on the outer wall of the middle portion 404.

It should be noted that the use of multiple openings 506, such as in the figure shown, may allow for some advantages over a single opening. Having multiple openings 506 allows for the use of multiple reservoirs, such that the external chamber is made up of multiple sub-chambers. This feature is discussed in more detail in regards to FIGS. 8 and 9.

Figure 7:
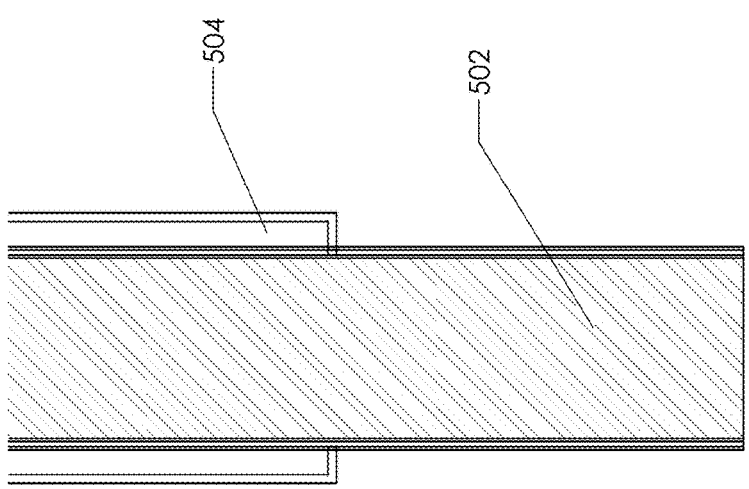
FIG. 7 shows a side cross-section view of one embodiment of a multi-chambered housing.

FIG. 7 is a cross-section view of one embodiment of a double-walled housing. More specifically, the figure illustrates the same double-walled housing 400 shown in FIG. 5, but is zoomed into the bottom of double-walled housing 400 in order to show additional detail.

As seen in the figure, the main chamber 502 extends to the bottom of the double-walled housing 400. The reservoir 504 can also be seen.

Figure 8:
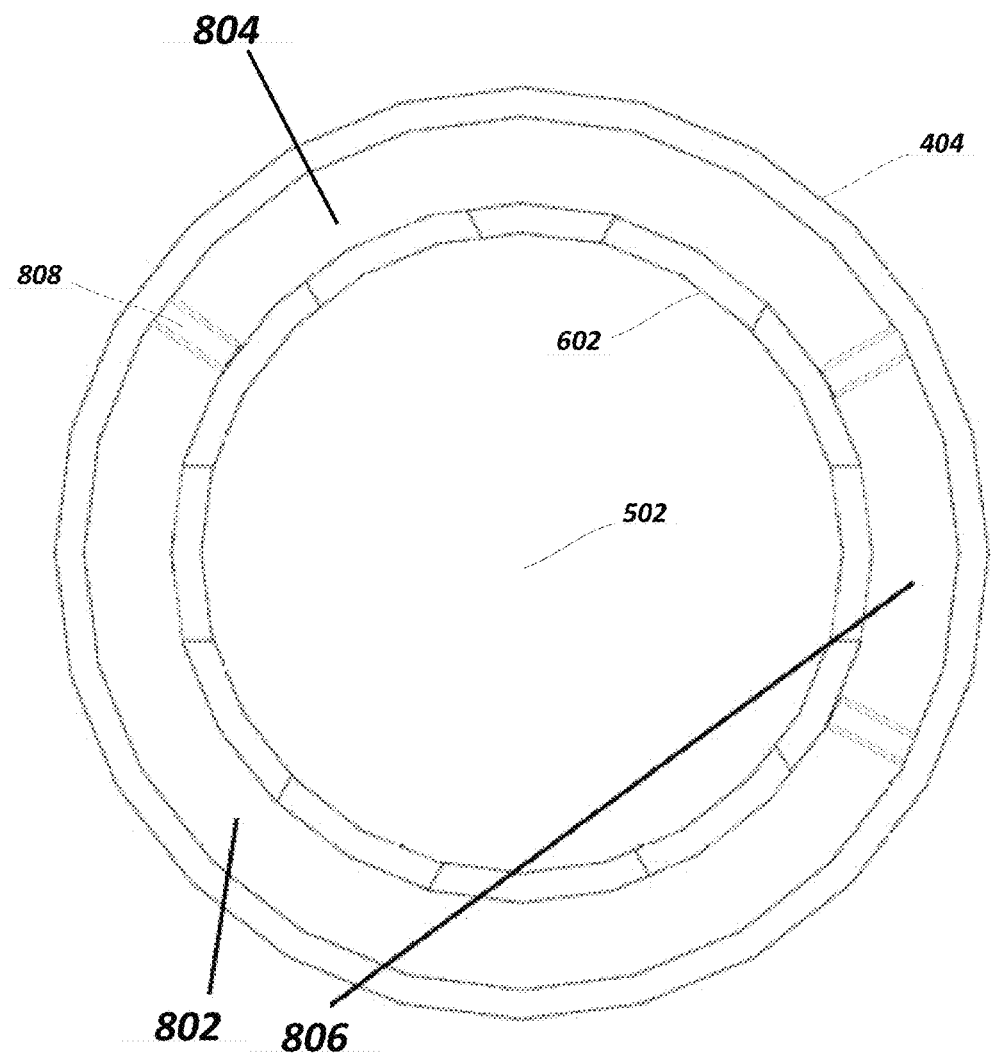
FIG. 8 shows a top cross-section view of one embodiment of a multi-chambered housing.

FIG. 8 is a cross-section view of one embodiment of a double-walled housing. More specifically, the figure shows the cross-section of one embodiment of a double-walled housing that was cut in half laterally.

In this embodiment of a double-walled housing, the main chamber 502 defined by the inner wall 502 can still be seen. However, the external chamber (referred to as reservoir 504) in previous figures is now actually made up of multiple sub-chambers. These multiple sub-chambers may be multiple reservoirs, which operate independently of one another. The figure shows a reservoir 802 having the largest volume, a reservoir 806 having the lowest volume, and a reservoir 804 having a volume between the volumes of the reservoir 802 and the reservoir 806. All three of these reservoirs are located in the space between the inner wall 602 and the outer wall of the middle portion 404.

The external chamber may be split into multiple reservoirs using the vertical ribs 808, which may be walls that run inside the middle portion 404, between the inner wall 602 and the outer wall of the middle portion 404. This can be better seen in the next figure, FIG. 9. Thus, the various openings 506 within the double-walled housing 400 may lead to different reservoirs.

Figure 9:
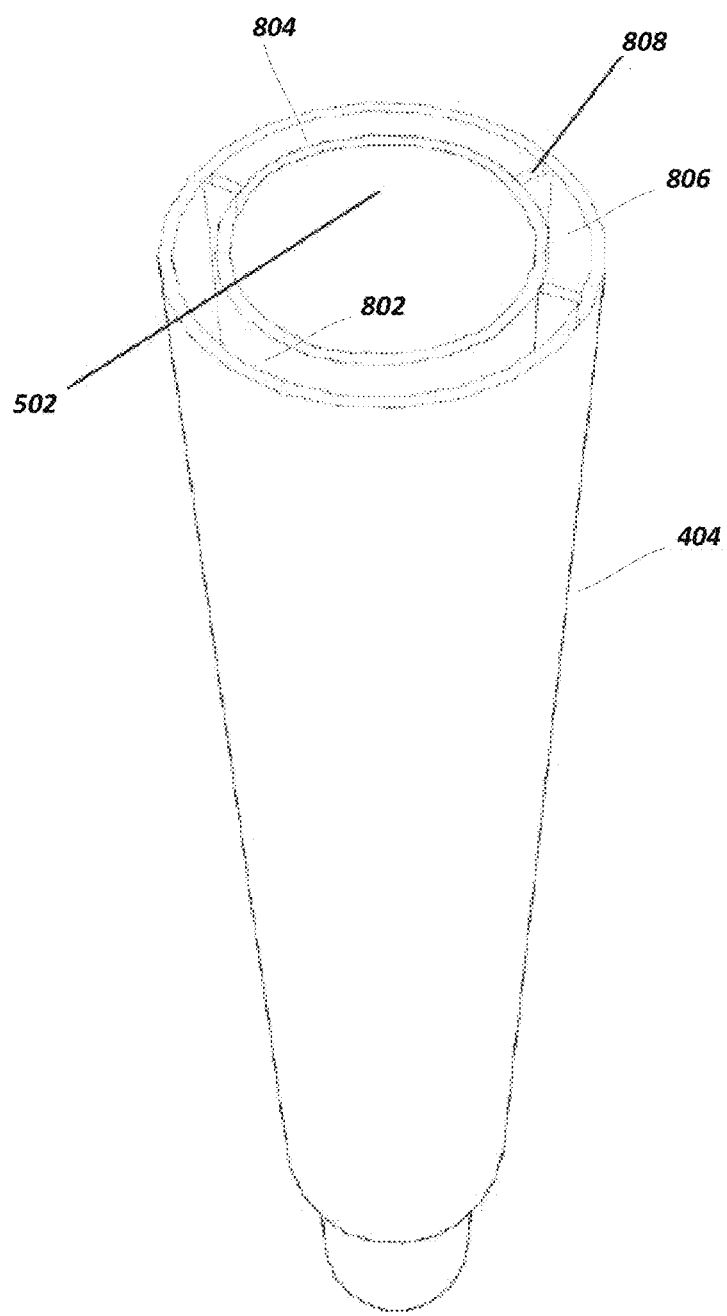
FIG. 9 shows a cutaway perspective view of one embodiment of a multi-chambered housing.

FIG. 9 shows a cutaway perspective view of one embodiment of a double-walled housing.

In this embodiment, the reservoir 804, the reservoir 806, and the reservoir 802 can be seen spanning the length of the middle portion 404 of the double-walled housing. Dividing up the external chamber into multiple reservoirs allows each of these reservoirs to be used for a different purpose.

For example, the reservoir 802, which is the largest reservoir, may be used to store extra air for refills or to store air in order to collapse the pogo stick. At the same time, the reservoir 806, which is the smallest reservoir, could be used to store high pressure air or gas (e.g., nitrogen or carbon dioxide) which could be dumped into the main chamber 502 in order to provide a boost to the jump height over the next few jumps.

Figure 10:
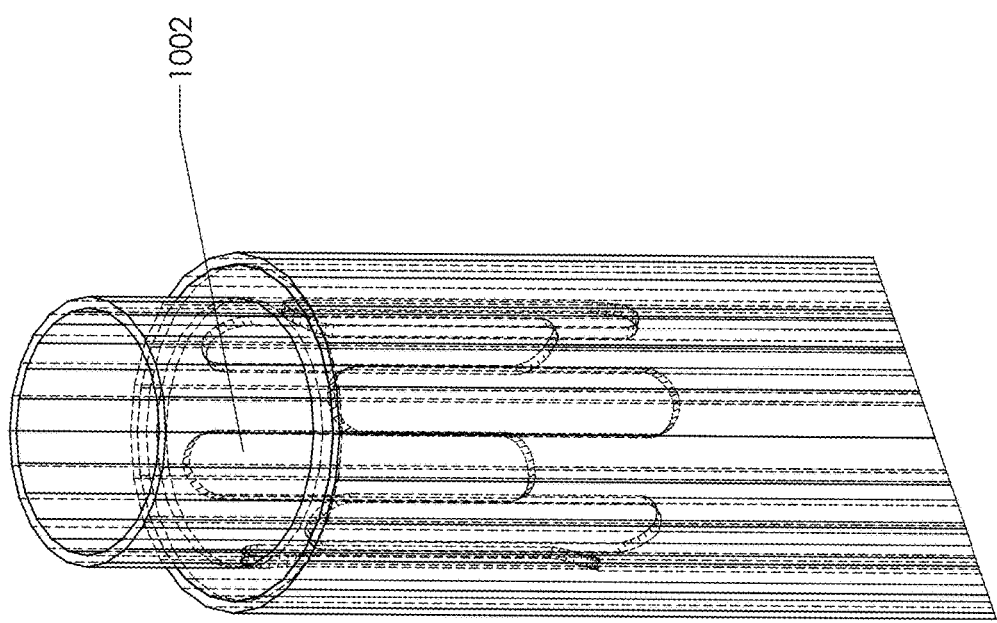
FIG. 10 shows a see-through perspective view of one embodiment of a multi-chambered housing.
Figure 11:
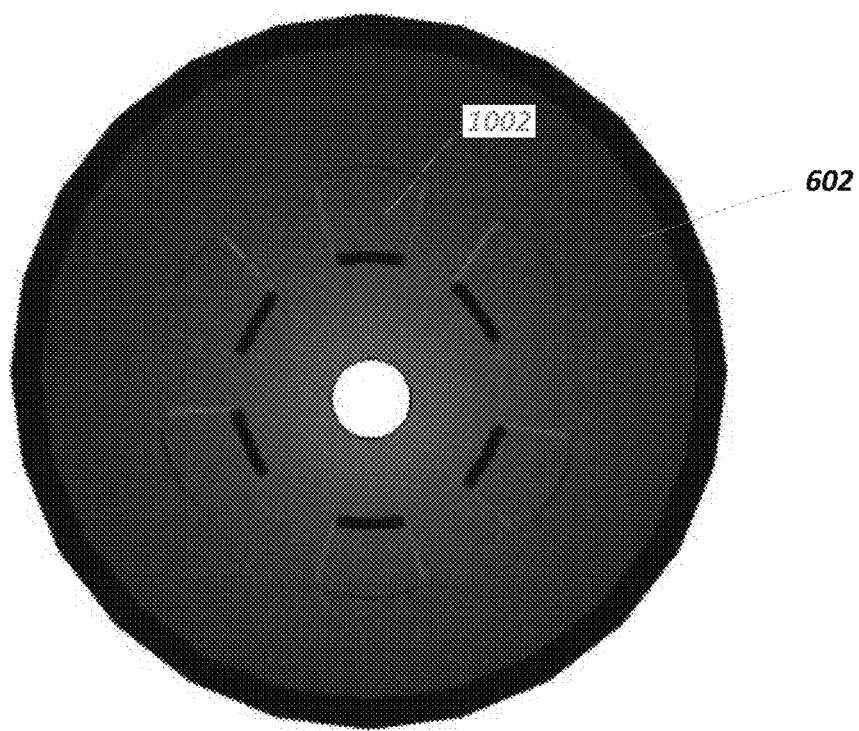
FIG. 11 shows a top perspective view of one embodiment of a multi-chambered housing.

FIG. 10 shows a see-through perspective view of one embodiment of a double-walled housing, while FIG. 11 shows a top perspective view of the same double-walled housing.

In these figures, an embodiment of a double-walled housing is shown having multiple openings 1002 which are evenly spaced around the circumference of the inner wall 602.

The invention claimed is:

1. A pogo stick, comprising:
a housing enclosing a volume of compressible working fluid;
a first chamber, having a first chamber volume, bounded at least partially by a piston and configured to at least partially enclose the volume of compressible working fluid;
a second chamber, having a second chamber volume, at least partially enclosing the volume of compressible working fluid, the second chamber volume being fixed;
the piston, configured to transition between at least a first position corresponding to a first chamber volume maximum and a second position corresponding to a first chamber volume minimum, at least a portion of the working fluid passing from the first chamber to the second chamber through a fluid connection as the piston transitions from the first position to the second position; and
a sliding shaft connected to the piston;
wherein the first chamber volume maximum and the first chamber volume minimum define a first chamber compression ratio;
wherein the first position of the piston corresponds to a total working fluid volume maximum and the second position of the piston corresponds to a total working fluid volume minimum, the total working fluid volume maximum including the first chamber volume maximum and the second chamber volume, the total working fluid volume minimum including the first chamber volume minimum and the second chamber volume; and
wherein the total working fluid volume maximum and the total working fluid volume minimum define a total compression ratio for the working fluid, the total compression ratio being less than the first chamber compression ratio.

2. The pogo stick of claim 1, further comprising a valve configured to open or close the fluid connection between the first chamber and the second chamber having a second chamber volume; and
wherein the fluid connection is opened or closed at least partially based on a pressure differential between the first chamber and the second chamber.

3. The pogo stick of claim 2, wherein the valve is configured to close the fluid connection as the piston transitions from the first position to the second position and is configured to open the fluid connection as the piston transitions from the second position to the first position.

4. The pogo stick of claim 2, further comprising a regulator configured to provide for an adjustment of the pressure differential at which the fluid connection is opened or closed.

5. The pogo stick of claim 4, wherein the regulator is configured to substantially close the fluid connection while the piston is in the second position.

6. The pogo stick of claim 1, wherein the first chamber volume in the second position is substantially zero.

7. The pogo stick of claim 1, wherein the working fluid is air.

8. The pogo stick of claim 1, wherein the working fluid is nitrogen.

9. The pogo stick of claim 1, wherein the working fluid is substantially sealed from an outside atmosphere within the first chamber and the second chamber.

10. The pogo stick of claim 1, further comprising a bumper, wherein the bumper limits a transition range of the piston within the first chamber.

11. A pogo stick, comprising:
a housing comprising a first chamber and a second chamber, the first chamber at least partially bounded by a piston and an inner wall, and configured to at least partially enclose a compressible working fluid;
a sliding shaft, connected to the piston;
the second chamber, at least partially bounded between an outer wall of the housing and the inner wall, the outer wall disposed radially outward of the inner wall;
a support structure mechanically and fixedly connecting the inner wall and the outer wall; and one or more vents configured to allow fluid to flow freely between the first chamber and the second chamber.

12. The pogo stick of claim 11, wherein the second chamber is partially bounded between a cylindrical portion of the inner wall and a cylindrical portion of the outer wall.

13. The pogo stick of claim 11, wherein the compressible working fluid is air.

14. The pogo stick of claim 11, wherein at least one of the one or more vents is disposed through the inner wall.

15. The pogo stick of claim 14, wherein the one or more vents comprise a plurality of vents radially disposed between the inner and outer wall.

16. The pogo stick of claim 11, further comprising a bumper, wherein the bumper limits a transition range of the piston.

17. The pogo stick of claim 11, wherein a volume of the second chamber equals or exceeds a volume of the first chamber at any point on a trajectory of the piston.

18. The pogo stick of claim 11, wherein a volume of the second chamber is at least 50% of a volume of the first chamber at all points on a trajectory of the piston.

19. The pogo stick of claim 11, wherein at least one vent of the one or more vents are disposed along a linear trajectory of the piston, so that there exists a first position of the piston wherein the one vent is substantially closed by the piston, and there exists a second position of the piston wherein the one vent is at least partially open.

20. A method of manufacturing a pogo stick, the method comprising:
    providing a housing;
    forming a first cylindrical chamber at least partially within said housing, wherein the first cylindrical chamber is at least partially bounded by a piston and by an inner wall, and is configured to at least partially enclose a compressible working fluid;
    connecting a sliding shaft to the piston;
    forming a second cylindrical chamber, at least partially bounded by an outer wall and the inner wall, the outer wall coupled with the inner wall by one or more vertical ribs; and
    forming one or more open vents, providing a fluid connection between the first chamber and the second chamber.

* * * * *